United States Patent [19]

Orr

[11] 3,905,661
[45] Sept. 16, 1975

[54] SPRING LOADED BEARING ARRANGEMENT

[75] Inventor: Robert S. Orr, Pekin, Ill.

[73] Assignee: Caterpillar Tractor Co., Peoria, Ill.

[22] Filed: May 28, 1974

[21] Appl. No.: 473,893

[52] U.S. Cl............................ 308/207 A; 180/9.62
[51] Int. Cl.² ........................................ F16C 25/00
[58] Field of Search........... 308/207 A, 204, 189 A, 308/64, 17; 180/9.62

[56] References Cited
UNITED STATES PATENTS

| | | | |
|---|---|---|---|
| 675,618 | 6/1901 | Bartholomew.................. | 308/207 A |
| 1,556,997 | 10/1925 | Johnston......................... | 308/189 A |
| 1,863,615 | 6/1932 | Blydensburgh.................. | 308/207 A |
| 2,836,473 | 5/1958 | Tydeman......................... | 308/207 A |
| 3,686,986 | 8/1972 | Ledergeber et al............. | 308/189 A |

FOREIGN PATENTS OR APPLICATIONS

| | | | |
|---|---|---|---|
| 67,256 | 4/1940 | Czechoslovakia............... | 308/207 A |

Primary Examiner—Kenneth H. Betts
Assistant Examiner—John A. Pekar
Attorney, Agent, or Firm—Ralph E. Walters

[57] ABSTRACT

A spring loaded bearing structure providing automatic maintained preloading of one or more bearings such as for use in rotatably mounting structures such as tractor sprockets and track frames. In the disclosed embodiment, the bearing structure includes a carrier mounted adjustably to a shaft and a first resilient force transfer element effecting a preselected preloading of the bearing structure mounting the sprocket and which is automatically maintained during the life of the bearing structure notwithstanding wear thereof. The carrier also mounts a second resilient force transfer element for providing and maintaining a preselected preloading of the bearing structure carrying the track frame notwithstanding subsequent wear of the track frame bearing structure. The carrier may be coaxially disposed intermediate the two bearing structures with the force transfer elements extending coaxially oppositely therefrom.

10 Claims, 2 Drawing Figures

3,905,661

SPRING LOADED BEARING ARRANGEMENT

BACKGROUND OF THE INVENTION

1. Field of the Invention

This invention relates to bearing structures and in particular to bearing structures for use in supporting rotatable and pivotable members.

2. Description of the Prior Art

In U.S. Pat. No. 2,702,603 of Norman E. Risk et al, owned by the assignee hereof, an improved bearing mounting for tractor driver members is disclosed wherein a track sprocket is rotatably carried on a fixed shaft by an improved bearing structure. The track frame is pivotally mounted to the shaft by a second improved bearing structure. As indicated therein, the bearing mounting is adapted for use in track-type tractors of the type disclosed in Harmon S. Eberhard U.S. Pat. No. 2,022,651. The present invention comprehends a bearing structure arrangement which is a further improvement over that of the Risk et al patent.

In U.S. Pat. No. 2,397,910 of David B. Baker et al, a tractor frame and drive shaft bearing structure is disclosed wherein the track roller frame is carried separately from the gear and track sprocket mounting. The bearing structure thereof, however, requires difficult periodic preload adjustment and, thus, presents a serious problem in maintenance of the apparatus. Failure to maintain the proper preload on the bearing structure shortens the life of the bearings, gears, adjacent seals, and track drive and, thus, presents a serious economic problem.

In U.S. Pat. No. 3,670,630 of Henry K. Tyson et al, a resilient bearing connecting means is disclosed for connecting an elongate member to a drive means primarily for accommodating misalignment in the connecting means such as in compressor systems.

SUMMARY OF THE INVENTION

The present invention, as indicated above, comprehends an improved bearing structure eliminating the disadvantages of the prior art structures in a novel and simple manner. The bearing structure of the present invention provides for automatic maintenance of preloading of bearing means whereby extended maintenance-free life of the apparatus is provided.

In the illustrated embodiment, the bearing structure includes means for applying and maintaining preloading of the bearing including a carrier and resilient force transfer means carried by the carrier for effecting the preloading function. As the preloading means is resilient, the preloading force is maintained throughout the useful life of the bearing. notwithstanding wear thereof and, thus, eliminates the need for costly and difficult preload adjustment as required in the prior art structures.

The bearing structure may include a first bearing means for rotatably supporting a drive sprocket, and a second bearing means for pivotably supporting a track frame to a common fixed shaft. The carrier defines a common means for carrying a plurality of resilient force transfer means so as to provide the maintained preselected preloading of each of the bearing means automatically. Thus, in the illustrated embodiment, the carrier is interposed between the bearing means and utilizes oppositely extending spring means for providing the preloading function in connection with each of the two different bearing means.

The bearing means may comprise dissimilar bearing means, and in the illustrated embodiment, the sprocket bearing means comprises tapered roller bearing means whereas the track frame pivot bearing means comprises radial flange-type sleeve bearing means.

Thus, the means for carrying the resilient force transfer means is effectively independent of the means for carrying the bearings while yet provides for suitable adjustment to effect the desired preloading of each of the bearing means.

Installation of the bearing structure of the present invention is extremely simple and economical and permits for facilitated maintenance or replacement when desired.

Thus, the bearing structure of the present invention is extremely simple and economical while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
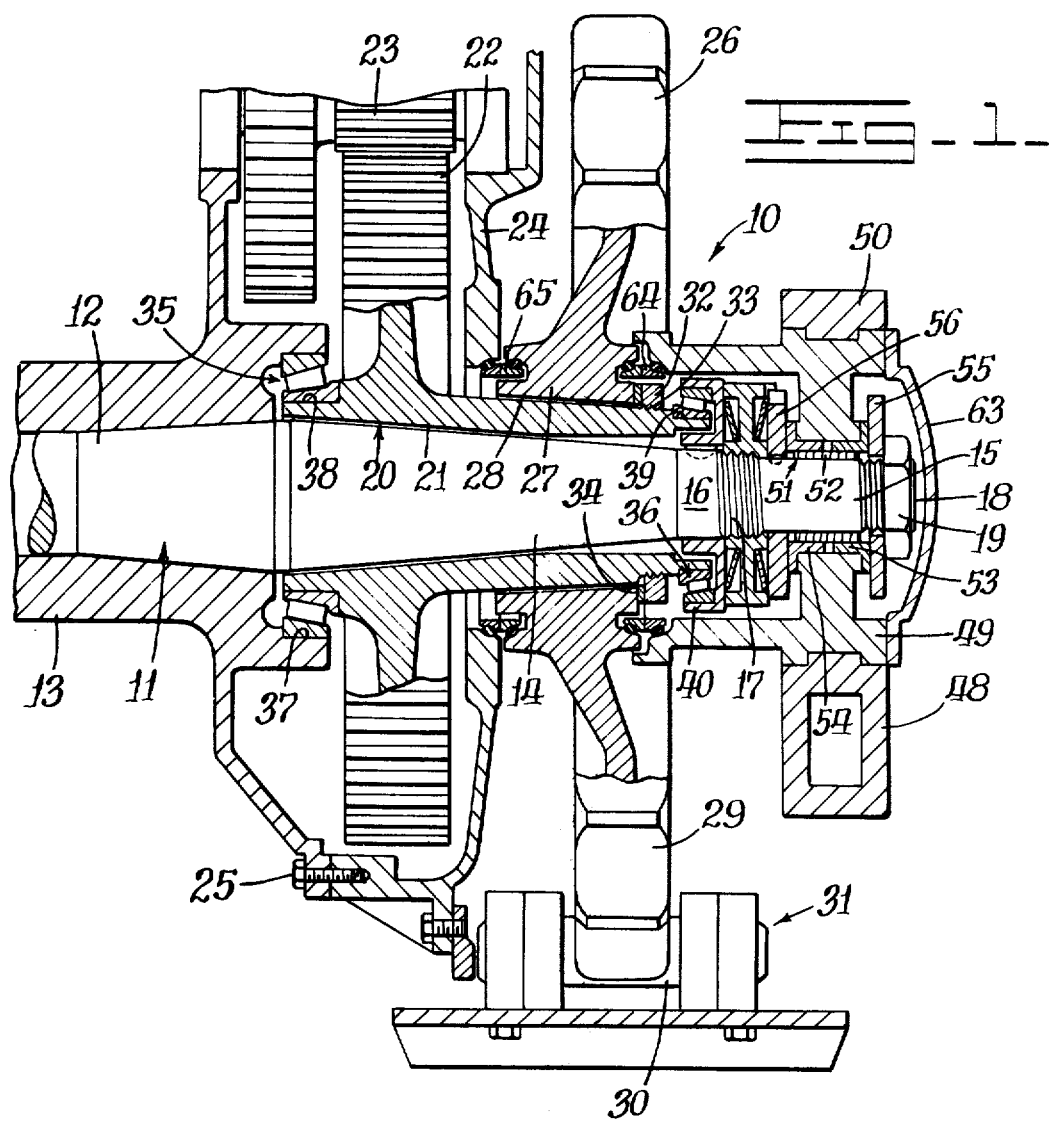
FIG. 1 is a fragmentary vertical section of a final drive portion of a track-type tractor provided with a bearing structure embodying the invention.

In the exemplary embodiment of the invention as disclosed in the drawing, a bearing structure generally designated 10 is shown to comprise a fixed shaft 11 including an inner portion 12 carried by a conventional bevel gear and steering clutch case 13, an outwardly narrowing frustoconical portion 14 and a cylindrical distal end portion 15. Intermediate portions 14 and 15, the shaft is provided with an inner cylindrical bearing mounting portion 16 and an outer threaded portion 17. The distal end 18 of end portion 15 is threaded for receiving a suitable nut 19.

A hub, or quill, 20 having a frustoconical bore 21 is disposed in coaxial spaced relationship about shaft portion 14 and carries a drive gear 22 which is driven by a cluster gear 23 from a suitable power source (not shown). The gears are enclosed in a suitable housing 24 which may be secured to case 13 by suitable threaded means, such as bolts 25.

A track chain sprocket 26 is secured to the hub 20 by means of a hub portion 27 through a spline connection 28. As shown in FIG. 1, the teeth 29 of sprocket 26 engage suitable bushings 30 of a track chain generally designated 31. Sprocket hub 27 is fixed to gear hub 20 by a nut 32 threaded to a threaded portion 33 of hub 20 and a washer 34.

Hub 20 is rotatably coaxially mounted for rotation about shaft 11 by an inner tapered roller bearing 35 and an outer tapered roller bearing 36. Inner bearing 35 is mounted in a suitable recess 37 in case 13 and is received in a complementary recess 38 in the inner end of hub 20. Bearing 36 is received in a recess 39 in the outer end of hub 20 and is mounted in an annular bearing cage 40 defining an axially inwardly opening annular recess 41 receiving the outer end 42 of hub 20 and the roller bearing 36. Bearing cage 40 is axially movably connected to shaft 11 by a key 43 received in a suitable axial groove 44 in shaft portion 16. Thus, bearing cage carrier 40 may be urged inwardly to provide a preloading of the bearings 35 and 36 to provide improved rotatable support of the hub 20.

The desired preloading force is applied to bearing cage 40 by a carrier 45 provided with an annularly axially inwardly opening recess 46 in which is mounted resilient force transfer element 47 resiliently engaging cage 40. Carrier 45 is threadedly secured to shaft portion 17 for providing manual adjustment of the preloading force.

A rail portion 48 of a track roller frame is pivotably mounted to the outer end 15 of shaft 11 by means of a bearing housing 49. The bearing housing is clamped to rail 48 by a suitable clamp 50 and is rotatably mounted to shaft portion 15 by a sleeve bearing structure generally designated 51 which includes a cylindrical inner bearing 52 and radial flange bearings 53 and 54, as shown in FIG. 1.

Figure 2:
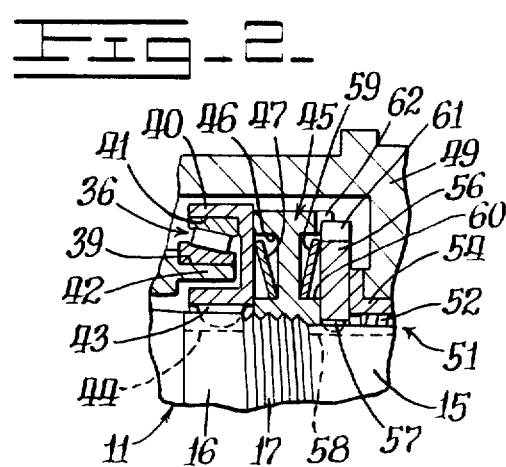
FIG. 2 is a fragmentary enlarged vertical section of a portion thereof.

Bearing 51 is preloaded by means of a force developed by nut 19 acting through a washer 55 to urge bearing 51 axially inwardly against a backup plate 56 which, in turn, outwardly abuts the carrier 45, as shown in FIG. 2. Backup plate 56 is provided with a key 57 received in a suitable groove 58 in shaft portion 15 for locking the plate against rotation while permitting axial movement thereof relative to the shaft. A second force transfer element 59 is received in an axially outwardly opening recess 60 in carrier 45 to bear against the plate 56. As further shown in FIG. 2, backup plate 56 includes a tang 61 slidably received in a slot 62 in carrier 45 for locking the carrier against rotation on threaded shaft portion 17 and thereby effectively maintaining the adjusting position of the carrier on the shaft. To permit such locking in the desired threaded position, the carrier may be provided with a plurality of circumferentially spaced such slots 62.

A dust seal 63 may be provided to seal the outer end of the structure and suitable "Duo-Cone" seals 64 and 65 may be provided for sealing the bearing housing 49 and housing 24 to the sprocket hub 27, as shown in FIG. 1.

In use, the desired preload of bearings 35 and 36 is effected, as discussed above, by suitable adjustment of carrier 45 on threaded shaft portion 17 whereby the carrier bears against bearing cage 40 with resilient force transfer element 47 being compressed within recess 46. In the illustrated embodiment, force transfer elements 47 and 59 comprise frustoconical springs, it being obvious to those skilled in the art that any suitable biasing means may be utilized within the scope of the invention. The adjustment of carrier 45 is effected prior to the mounting of backup plate 56 and the bearing 51 to the shaft portion 15. When the carrier is adjusted to provide the desired preload on bearings 35 and 36, the backup plate is installed on shaft portion 15 with tang 61 received in the selected slot 62 of the carrier to lock the carrier against rotation and thereby maintain the preselected loading on bearings 35 and 36. Sleeve bearing 51 is then installed on shaft portion 15 together with bearing housing 49 for pivotally mounting the whole track roller frame on shaft 11. Washer 55 and nut 19 are then installed on threaded shaft distal end 18 to apply a desired preloading force to the bearing 51. Nut 19 may be suitably locked to shaft end 18 in the adjusted position by suitable pin means (not shown).

Thus, carrier 45 cooperates with each of the two different bearing means to provide a desired preloading thereof. The force transfer elements 47 and 59 effectively maintain the preloading force automatically during the useful life of the respective bearings by accommodating the wear on the bearings as a result of the expansion of the resilient springs outwardly from the recesses 46 and 60 of the carrier. Thus, spring 47 maintains the biasing force against bearing cage 40 originally provided by the adjusted positioning of carrier 45 on shaft threaded portion 17 effectively during the useful life of bearings 35 and 36 thereby eliminating the need for periodic manual reapplication of the desired preloading force. Similarly, resilient spring 59 maintains the preselected preloading force originally provided by the adjustment of nut 19 on sleeve bearing 51 effectively during the useful life thereof eliminating the need for periodic reapplication of the desired preload force as in the prior art devices.

As will be obvious to those skilled in the art, the spring force transfer elements 47 and 59 may be suitably preselected to provide the desired maintained preloading forces proper for each of the bearings 35, 36 and 51. As will be obvious to those skilled in the art, the selection of the preload force may be made to be entirely by means of the resilient springs as by suitably securing the carrier to shaft 11 with the spring element 47 extending slightly from the recess 46 in the original disposition and with the plate 56 spaced slightly from the carrier in its original disposition. Where the structure is so utilized, the carrier may be positioned on the shaft by means of a fixed stop (not shown) in lieu of the threaded shaft portion 17.

Thus, the present invention provides for a facilitated control of the preloading force on a plurality of bearings on a common shaft eliminating the need for periodic readjustment of the preloading force as required in the prior art structures in an extremely simple and novel manner.

The foregoing disclosure of specific embodiments is illustrative of the broad inventive concepts comprehended by the invention.

I claim:

1. Bearing structure of the character described comprising:
   a bearing for rotatably supporting a rotatable means;
   support means including a bearing cage for movably supporting said bearing;
   a carrier adjacent said support means;
   resilient force transfer means carried by said carrier in engagement with said support means; and
   means for positioning said carrier in abutment with said support means to apply a preselected force through said resilient force transfer means to said support means for effectively preloading said bearing and maintaining said preloading notwithstanding subsequent wear of the bearing.

2. The bearing structure of claim 1 wherein said support means includes a fixed element carrying said bearing cage.

3. The bearing structure of claim 1 further including a second bearing, retaining means preloading said second bearing adjacent said carrier oppositely of said first named bearing, and second resilient force transfer means carried by said carrier engaging said retaining means for maintaining said preloading notwithstanding subsequent wear of the second bearing.

4. The bearing structure of claim 1 wherein the rotatable means defines a tractor chain sprocket.

5. The bearing structure of claim 1 further including a second bearing, retaining means preloading said second bearing adjacent said carrier oppositely of said first name bearing, and second resilient force transfer means carried by said carrier engaging said retaining means for maintaining said preloading notwithstanding subsequent wear of the second bearing, said means retaining said second bearing including means adjustably urging said second bearing toward said second resilient force transfer means.

6. The bearing structure of claim 1 wherein said force transfer means comprises a conical spring.

7. Bearing structure of the character described for rotatably mounting a drive sprocket, comprising:
a shaft;
a bearing for rotatably supporting the drive sprocket for rotation coaxially on the shaft;
support means including a bearing cage for movably supporting said bearing on said shaft;
a carrier adjacent said support means;
resilient force transfer means carried by said carrier in engagement with said support means; and
means for selectively positioning said carrier on said shaft to apply a preselected force through said resilient force transfer means to said support means for effectively preloading said bearing and maintaining said preloading notwithstanding subsequent wear of the bearing.

8. The bearing structure of claim 7 wherein said means for selectively positioning said carrier comprises cooperating threaded means on said carrier and shaft.

9. The bearing structure of claim 7 further including a second bearing rotatably supporting the drive sprocket, said force further acting to effectively preload said second bearing and maintain the preloading notwithstanding wear of said bearings.

10. The bearing structure of claim 7 further including a second bearing rotatably supporting the drive sprocket, and a drive gear connected to the sprocket for rotatable support therewith by said bearings, said force further acting to effectively preload said second bearing and maintain the preloading notwithstanding wear of said bearings.

* * * * *